United States Patent [19]

Gittner et al.

[11] 4,177,239
[45] Dec. 4, 1979

[54] BLOW MOLDING METHOD

[75] Inventors: Franz Gittner, Soltendieck; Arnaldo Gläser, Bodenteich; Klaus D. Kötke, Lüder, Reinstorf, all of Fed. Rep. of Germany

[73] Assignee: Bekum Maschinenfabriken GmbH, Berlin, Fed. Rep. of Germany

[21] Appl. No.: 893,833

[22] Filed: Apr. 6, 1978

[30] Foreign Application Priority Data

Apr. 20, 1977 [DE] Fed. Rep. of Germany ....... 2717365

[51] Int. Cl.$^2$ .............................................. B29C 17/07
[52] U.S. Cl. .................................... 264/530; 264/529; 264/532
[58] Field of Search .................... 264/89, 90, 92, 94, 264/96, 97, 98, 99, 296, 529, 530, 532, 534; 425/525, 529, 530

[56] References Cited

U.S. PATENT DOCUMENTS

| | | | |
|---|---|---|---|
| 3,865,530 | 2/1975 | Jessellaee et al. ..................... | 425/529 |
| 3,865,531 | 2/1975 | Moore et al. ........................... | 425/525 |
| 4,035,455 | 7/1977 | Rosenkranz et al. ................ | 264/89 X |
| 4,042,657 | 8/1977 | Ostapchenko et al. ........... | 264/89 X |

Primary Examiner—Jan H. Silbaugh
Attorney, Agent, or Firm—Peter K. Kontler

[57] ABSTRACT

Thermoplastic pre-forms which are obtained as a result of expansion of parisons in a pre-form blow mold are transformed into bottles or analogous hollow shaped articles in a final blow mold. The first stage of transformation involves mechanical stretching of the pre-form in the cavity of the final mold simultaneously with or prior to admission of a compressed blowing fluid to expand the major portion of the pre-form into contact with the adjacent surface of the final mold. The next stage involves admission of the blowing medium at a higher pressure to effect abrupt biaxial expansion of the closed end and of the portion intermediate the closed end and the major portion into contact with the adjacent surfaces of the final mold. The configuration of surfaces which are contacted by the bottom and intermediate portion of the shaped article is such that radial expansion of the corresponding portions of the pre-form in response to admission of blowing fluid at an elevated pressure necessarily takes place simultaneously with axial expansion. This is achieved by employing a final blow mold with a fixed internal bottom surface which causes the bottom of the shaped article to assume a concavo-convex shape, or by employing a final mold whose bottom surface is movable in a direction to reduce or increase the volume of the cavity prior to admission of blowing fluid at elevated pressure.

11 Claims, 14 Drawing Figures

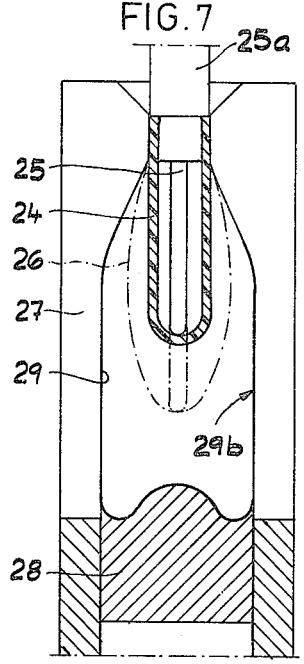
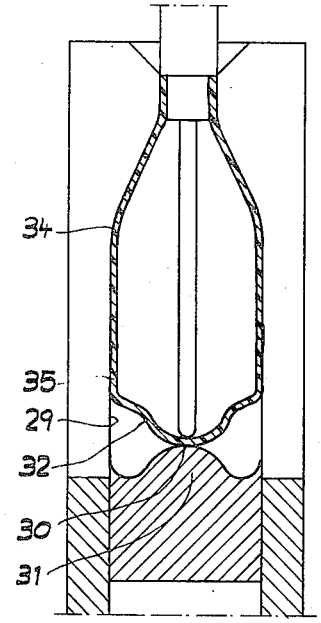
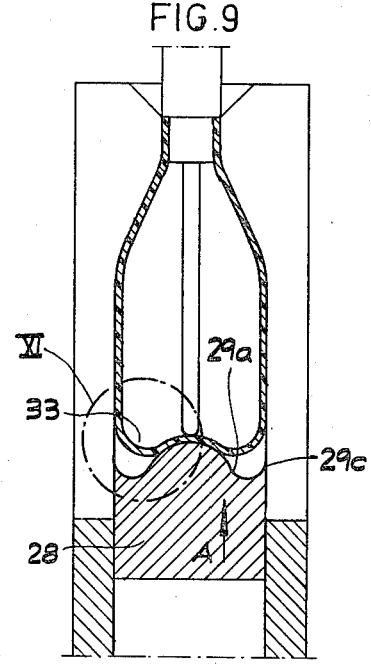
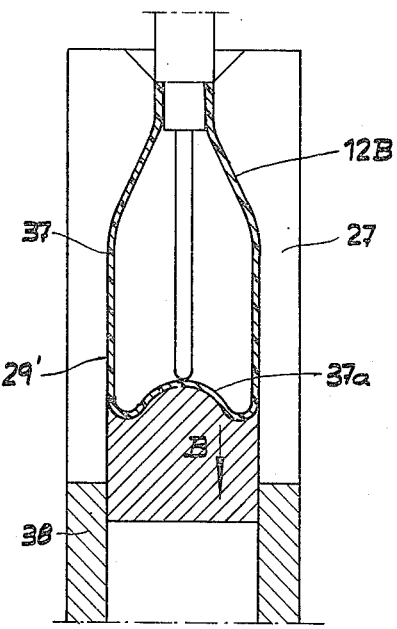
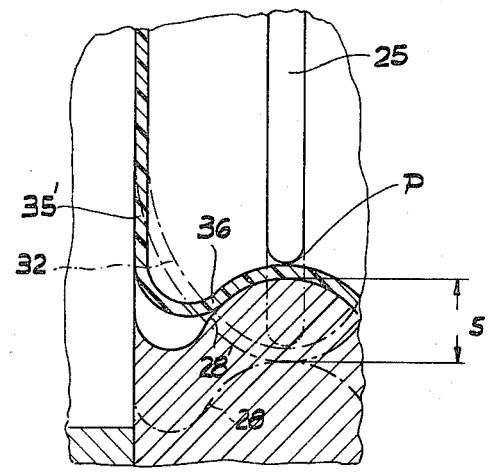

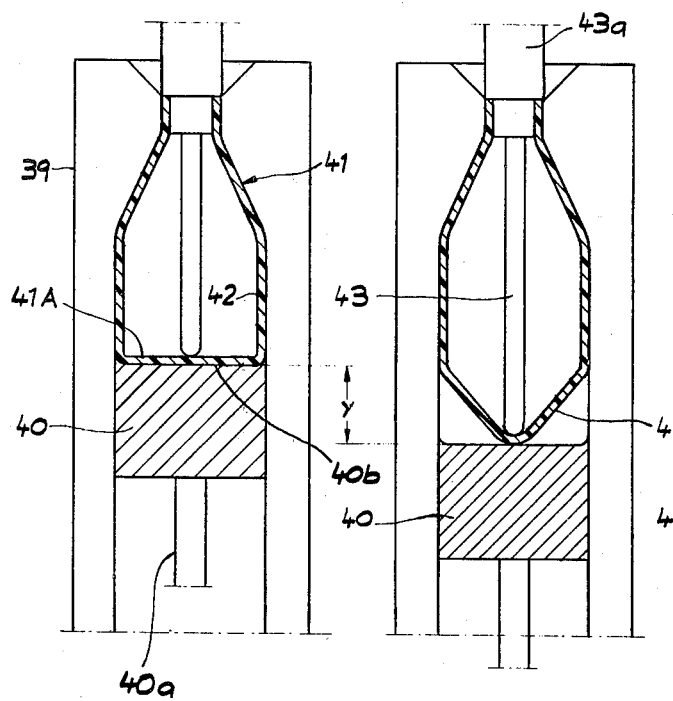

BLOW MOLDING METHOD

BACKGROUND OF THE INVENTION

The present invention relates to blow molding in general, and more particularly to improvements in multi-stage methods of transforming blowable thermoplastic bubbles or parisons into bottles or other types of hollow shaped articles. Still more particularly, the invention relates to improvements in blow molding methods which involve conversion of an extruded or injection molded parison which is open at one end and closed at the other end into a pre-form and subsequent conversion of the pre-form into a finished hollow article, such as a bottle or the like. Methods of the just outlined character are practiced by resorting to a pre-form blow mold wherein a parison is converted into a pre-form whose volume exceeds the volume of the parison but is less than the volume of the finished article, and to a final blow mold wherein the pre-form is transformed into a finished article. It is further known to mechanically stretch the pre-form in the final blow mold and to effect pneumatic expansion of the pre-form in two stages the first of which includes converting the major (tubular) portion of the pre-form into the corresponding portion (tubular wall) of the shaped article and the second of which includes converting the remaining portion, namely, the closed end of the pre-form, into the corresponding portion (bottom) of the shaped article.

The method of the present invention belongs to that group of blow molding methods which involve biaxial orientation of thermoplastic material. The main difference between standard blow molding techniques and a method which involves biaxial orientation is that the latter method is carried out in several stages, i.e., pneumatic expansion of a parison into full contact with the surface bounding the cavity of a blow mold includes at least two steps. Thus, the parison is converted into a so-called pre-form whose volume exceeds the volume of the parison but is less than the volume of the shaped article, and the pre-form is thereupon pneumatically expanded (either in a single step or in several steps) to complete the transformation into a hollow shaped article. Multi-stage conversion of parisons into bottles or the like is intended to bring about pronounced stretching of molecules of the thermoplastic material which constitutes the tubular wall (i.e., the major portion) of the shaped article. To this end, the deformation takes place while the material which is to form the wall is maintained close to the lower limit of the acceptable temperature range and is thereupon caused or allowed to set by cooling (this is known as "freezing" of the material of the wall). Such mode of treatment enhances the physical characteristics (especially the strength) of the wall. It has been found that the strength of a wall which was subjected to biaxial orientation is much more pronounced than the strength of a wall which was formed in accordance with standard blow molding techniques. Greater strength of the wall material is desirable for several reasons, i.e., to enhance the stability of the corresponding major portion of the finished article or to allow for a reduction of the wall thickness of the article.

More specifically, the present invention relates to that class of blow molding methods which involve biaxial orientation of theremoplastic material and which further involve mechanical stretching of the pre-form, either prior to or simultaneously with conversion of the pre-form into a finished article. As a rule, mechanical stretching is effected by resorting to a blow tube or mandrel which includes a reciprocable core or rod that is movable against the inner side of the closed end of a pre-form and makes the pre-form longer by moving its closed end in a direction away from the open end. However, it is also known to grip the closed end of a pre-form from the outside and to pull the thus gripped closed end in a direction away from the open end. Reference may be had to U.S. Pat. No. 3,781,395, which discloses a blow molding apparatus wherein a parison is introduced into a pre-form blow mold and is converted into a bag-like pre-form. At the same time, the neck portion of the parison is converted into the neck portion of the finished shaped article by compression molding between the periphery of a blow tube or an insert which extends into the open end of the parison and the surrounding neck portion of the pre-form mold. The pre-form is thereupon introduced into a final blow mold wherein the neck portion is engaged by the adjacent part of the mold and by the blow tube or by a discrete insert. The blow tube or the insert carries a reciprocable rod-like stretching member which serves to move the closed end of the pre-form away from the neck portion. The stretching member may constitute a blow tube, i.e., it can have one or more passages and one or more orifices for admission of a blowing fluid into the interior of the pre-form. When the outer side of the closed end of the pre-form reaches or comes very close to the bottom surface of the final blow mold, the pre-form is expanded in response to admission of a blowing fluid via blow pipe, aforementioned insert and/or stretching member. Thus, the pre-form is subjected to radial expansion which follows mechanical stretching and the expansion continues until the entire external surface of the resulting shaped article contacts the entire internal surface of the final blow mold.

A drawback of the just described method is that biaxial orientation of the material in the bottom of a finished article is not as satisfactory as biaxial orientation of the major portion or wall of the article. Therefore, such articles exhibit weakened portions, especially in the transition zone between the bottom and the peripheral wall. Such weakened portions are likely to break, i.e., the improved stability of the peripheral wall as a result of satisfactory biaxial orientation of its material is to no avail because the stability of the remaining portion or portions of the shaped article is much less satisfactory.

Though each of the factors which are responsible for the development of weaker portions in shaped articles produced in accordance with the method disclosed in the aforementioned U.S. Pat. No. 3,781,395 is still now known, it is already established that the development of weakened portions is attributable to several factors. It is also established that two factors exert much greater influence upon the quality (or more accurately stated upon unsatisfactory quality) of shaped articles than all other factors together. The first important factor is that, when a pre-form is expanded into contact with the surfaces surrounding the cavity of the final blow mold, the major portion (peripheral wall) of the finished article undergoes pronounced and desirable biaxial orientation whereas the bottom portion merely expands in the radial direction or expands primarily in the radial direction. This will be readily appreciated since the bottom wall of a bottle or an analogous shaped article is normally located in a plane at right angles to the central vertical axis of the bottle. When the closed end of the pre-form is moved near to or into actual contact with the bottom surface in the final blow mold as a result of mechanical stretching, the admission of blowing fluid entails rather pronounced displacement of the major portion of the pre-form in the axial and radial directions of the mold cavity but the portion including the closed end expands mainly in the radial direction to contact the bottom surface in the final blow mold. In other words, the bottom surface of the final blow mold does not permit any discernible axial expansion in response to admission of compressed blowing fluid into the interior of the pre-form. The second important factor is that, in the majority of instances, mechanical stretching of the pre-form by means of a rod or by grippers results in much more pronounced axial stretching of the major portion of the pre-form, namely of that portion which extends from the open end (neck portion) toward but short of the closed end. In other words, and if the cavity of the final blow mold is upright, with the neck portion of the confined pre-form held between the upper portions of the mold sections, mechanical stretching is much more pronounced in the upper, middle and lower parts than in the lowermost part of the pre-form.

OBJECTS AND SUMMARY OF THE INVENTION

An object of the invention is to provide a novel and improved blow molding method which can be resorted to for the production of bottles or analogous hollow shaped articles whose physical characteristics are more satisfactory, especially more uniform, than the corresponding characteristics of shaped articles which are produced in accordance with heretofore known blow molding methods.

Another object of the invention is to provide a method of the just outlined character which insures, at least in connection with the manufacture of certain types and/or sizes of hollow shaped articles, that the quality of the bottom and of the part between the bottom and the major portion (peripheral wall) of a bottle or the like is just as satisfactory as the quality of the major part of the article.

A further object of the invention is to provide a method which insures more satisfactory orientation of molecules in the thermoplastic material of each and every portion of a finished article than the presently known multi-stage blow molding methods.

An additional object of the invention is to provide a novel and improved method of transforming a thermoplastic pre-form into a hollow shaped article.

An ancillary object of the invention is to provide a novel and improved final blow mold which can be utilized for the practice of the just outlined method.

The method of the present invention is resorted to for transformation of a hollow thermoplastic pre-form which is closed at one end and open at the other end into a hollow shaped article, e.g., into a bottle. The method comprises the steps of introducing a blow tube or the like into the open end of the pre-form and confining the pre-form in the cavity of a final blow mold, mechanically stretching the pre-form in the mold including increasing the distance between the open and closed ends of the pre-form, admitting into the pre-form a blowing fluid at a first pressure via the blow tube to effect progressive pneumatic expansion of the major portion of the pre-form against the mold in a direction from the open end toward but short of the closed end of the pre-form, and admitting into the pre-form a blowing fluid at a higher second pressure via blow tube to effect abrupt biaxial pneumatic expansion of the remaining portion of the pre-form against the mold. The mechanical stretching step may precede or coincides, at least in part, with the first fluid admitting step. The stretching step preferably includes applying a mechanical stress against the closed end at the interior of the pre-form to move the closed end in a direction away from the open end, and such mechanical stress can be reduced or terminated not later than in the course of the second fluid admitting step, preferably immediately prior to or during the initial stage of the second fluid admitting step. When the shaped articles are bottles or like containers of average size (e.g., with a capacity of between 0.2 and 2 liters), the first pressure is preferably in the range of between 0.5 and 2.5 bar, and the second pressure is preferably in the range of between 12 and 25 bar.

The method may further comprise the step of increasing or reducing the volume of the cavity of the final blow mold prior to the second fluid admitting step. Thus, and if the just mentioned step includes increasing the volume of the cavity, the first fluid admitting step may include expanding the entire pre-form into full contact with the mold prior to the volume-increasing step so that the original pre-form is converted into a modified or expanded pre-form. The volume-increasing step then includes enlarging the cavity beyond the closed end of the modified pre-form, and the stretching step then includes converting the closed end of the modified or expanded pre-form into a cone which is thereupon expanded in the course of the second fluid admitting step. The mold which is utilized for the practice of the just discussed modified method (which involves enlarging the volume of the cavity) preferably includes a transverse bottom surface bounding that part of the cavity which is remote from the open end of the pre-form (i.e., which is nearer to the closed end), and the first fluid admitting step then includes deforming the closed end of the original pre-form against the internal bottom surface of the mold so that the closed end resembles a flat or substantially flat disk. The volume-increasing step then includes shifting the bottom surface away from the closed end of the modified pre-form and the stretching step includes moving the central portion of the flat disk toward the shifted bottom surface to thereby convert the disk into a hollow cone.

The improved method, especially that embodiment of the method which includes reducing the volume of the cavity in the final blow mold, is preferably practiced by resorting to a blow mold wherein the cavity is bounded by a bottom surface remote from the open end of the pre-form in the mold, a peripheral surface which surrounds the pre-form in the cavity between the open end of the pre-form and close to the bottom surface, and an annular intermediate surface disposed between the peripheral and bottom surfaces. The first fluid admitting step includes expanding the pre-form into contact with the peripheral surface of the mold except for that portion of the peripheral surface which is immediately adjacent to the intermediate surface, and the second fluid admitting step includes expanding the pre-form against the aforementioned portion of the peripheral surface as well as against the intermediate and bottom surfaces. As mentioned above, the method may further include the step of converting the closed end of the pre-form into a hollow cone prior to the second fluid admitting step, and such converting step may include changing the volume of the cavity so that the hollow cone is spaced apart from the intermediate surface and from a portion at least of the bottom surface of the mold. If the bottom surface is located at a level below the peripheral surface, and if such bottom surface has an apex (preferably defined by a centrally located protuberance), the stretching step may include moving the closed end of the pre-form against the apex of the bottom surface and the volume changing step includes moving the bottom surface toward the open end of the pre-form to thereby reduce the volume of the cavity and to cause the closed end to overlie the apex of the bottom surface whereby such overlying portion of the closed end forms a hollow cone.

The second fluid admitting step may begin with a certain delay following completion of the first fluid admitting step, and the delay is preferably such as to allow the major portion of the pre-form to set as a result of heat exchange with the peripheral surface of the mold and/or with the blowing fluid whereby the major portion of the pre-form is capable of resisting expansion (namely, axial expansion) in the course of the second fluid admitting step.

The aforementioned volume reducing step in a final blow mold wherein the bottom surface has an apex can include moving the apex of the bottom surface to the general level of the nearest end of the expanded major portion of the pre-form, i.e., to the level of the uppermost point of the bottom of the finished article. The volume changing step may further include converting that portion of the pre-form which is located between the major portion and the hollow cone into an annular pocket; the volume changing step then preferably includes moving the annular pocket at least close to the intermediate surface of the mold.

The novel features which are considered as characteristic of the invention are set forth in particular in the appended claims. The improved method itself, however, will be best understood upon perusal of the following detailed description of certain specific embodiments of apparatus for the practice of the method with reference to the accompanying drawing.

BRIEF DESCRIPTION OF THE DRAWING

FIG. 7 is a central vertical sectional view of a second mold which can be used for the practice of a modified method according to the invention, the pre-form being shown in a state it assumes immediately upon introduction into the cavity of the final blow mold and in a different condition (indicated by phantom lines) upon completion of partial mechanical stretching and pneumatic expansion;

FIG. 8 illustrates the structure of FIG. 7 and shows the pre-form in a further stage of transformation into a bottle;

FIG. 9 illustrates the structure of FIG. 7 or 8, the pre-form being shown in still another intermediate stage of transformation into a bottle;

FIG. 10 shows the structure of FIG. 9, with a finished bottle in the cavity of the final blow mold;

FIG. 11 is an enlarged view of a detail within the phantom-line circle XI shown in FIG. 9;

FIG. 12 is a central vertical sectional view of a third final blow mold which can be used for the practice of a further method according to the invention, the pre-form being shown in a first stage of transformation into a bottle;

FIG. 13 illustrates the structure of FIG. 12, the pre-form being shown in a further stage of transformation into a bottle; and FIG. 14 illustrates the structure of FIG. 12 or 13 and the finished bottle.

DESCRIPTION OF THE PREFERRED EMBODIMENTS

Figure 1:
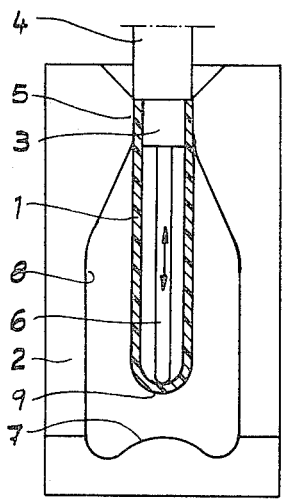
FIG. 1 is a diagrammatic central vertical sectional view of a final blow mold which is used for transformation of thermoplastic pre-forms into bottles in accordance with a conventional method, the pre-form being shown in a state which it assumes immediately upon introduction into the final blow mold.
Figure 2:
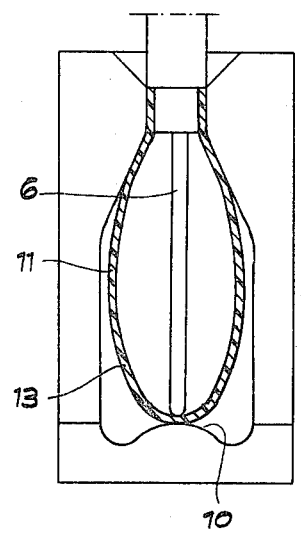
FIG. 2 illustrates the structure of FIG. 1 and an intermediate stage of transformation of the pre-form into a bottle.
Figure 3:
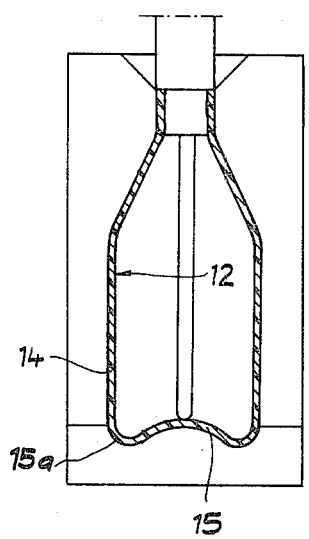
FIG. 3 illustrates the structure of FIG. 1 or 2 and the finished hollow shaped article.

FIGS. 1, 2 and 3 respectively illustrate a pre-form 1 and two phases of transformation of such pre-form into a finished hollow shaped article 12 in accordance with a conventional blow molding technique. The manner in which a pendant tube is formed, either by extrusion or injection molding, and in which the pendant tube is converted into the hollow pre-form 1 in the cavity of a pre-form mold is not shown in the drawing. The pre-form 1 which is shown in FIG. 1 has been removed from the pre-form mold (not shown) and is confined in a final blow mold 2 wherein its open end or neck portion 5 is held by the calibrating portion 3 of a final blow tube or mandrel 4. The blow tube 4 is provided with a coaxial mechanical stretching and blowing device here shown as an elongated rod 6 which is reciprocable in directions indicated by the arrow. When the rod 6 moves downwardly, as viewed in FIG. 1, it mechanically stretches the pre-form 1 by moving its closed end 9 in a direction toward the bottom 7 in the cavity 8 of the final blow mold 2. The gaseous blowing fluid is admitted into the pre-form 1 during mechanical stretching by the rod 6 or upon completion of the mechanical stretching step. The blowing fluid (e.g., air under pressure) can be admitted into the pre-form via one or more orifices in the final blow tube 4 and/or in the rod 6.

FIG. 2 shows the completion of the first phase of transformation of the pre-form 1 into a finished hollow shaped article 12. The mechanical stretching step is completed, i.e., the closed lower end 9 of the elongated and expanded pre-form 11 contacts or is closely adjacent to the centrally located raised section or apex 10 of the upper side of the bottom 7. The blow tube 4 and/or the rod 6 continues to admit air or another gaseous blowing fluid whereby the elongated and partially expanded pre-form 11 continues to expand and ultimately assumes the form (finished shaped article 12) which is shown in FIG. 3. The pressure of admitted blowing medium is effective in all directions, i.e., the expanded pre-form 11 which was mechanically stretched by the rod 6 and was axially expanded by the blowing fluid is subjected to additional radial and axial expanding action. The bottom portion 13 (expanded closed end 9) of the pre-form 11 is subjected to less pronounced mechanical stretching and to negligible pneumatic expansion during transformation of the pre-form 1 into the modified pre-form 11; this bottom portion 13 undergoes primarily a pneumatically induced radial expansion during transformation of the pre-form 11 into the finished article 12. Consequently, biaxial orientation of the main or major portion 14 of the finished article 12 is more uniform that that of the bottom 15; this affects the physical characteristics of the article 12, i.e., the strength of the bottom 15 and of the annular portion 15a between the bottom 15 and the major portion 14 is less satisfactory than the strength of the major portion 14.

Figure 4:
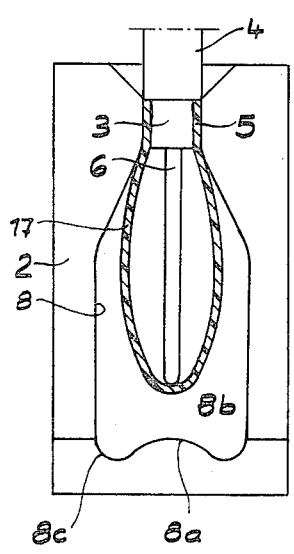
FIG. 4 illustrates the mold of FIGS. 1 to 3 and a pre-form which is about to be transformed into a bottle in accordance with a first embodiment of the improved method.
Figure 5:
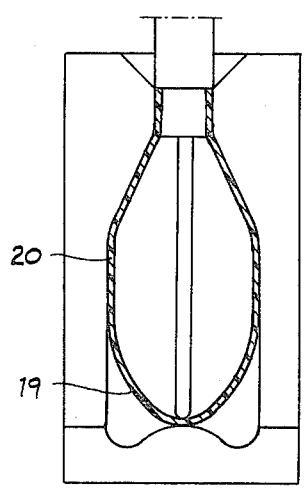
FIG. 5 shows the structure of FIG. 4 and the pre-form in an intermediate stage of transformation into a bottle.
Figure 6:
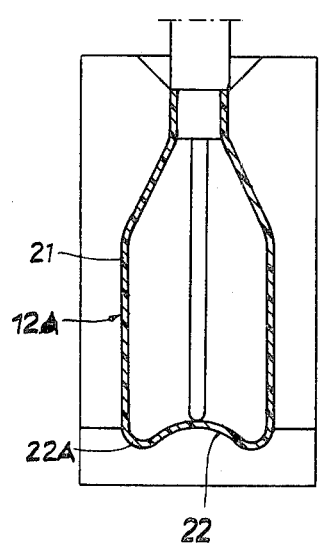
FIG. 6 illustrates the structure of FIG. 4 or 5 and the finished article.

FIGS. 4, 5 and 6 illustrate several stages of transformation of a pre-form 17 into a finished article 12A in accordance with one embodiment of the improved method. A feature of the improved method is that, during mechanical stretching of the pre-form 17 or immediately thereafter, the admission of a gaseous blowing fluid into the interior of the pre-form is regulated in such a way that the transformation of the pre-form into the finished article 12A takes place in a predictable manner. In other words, the expansion of the pre-form 17 is predictable in that the pre-form expands into contact with the normally cooled internal peripheral surface 8b of the final blow mold 2 prior to completion of the bottom 22. The major portion 21 of the article 12A is caused to contact the internal peripheral surface 8b during or immediately subsequent to mechanical stretching by the rod 6 to thus insure that the temperature of the major portion 21 of the pre-form drops below the deformation temperature (as regards the ability of the material of the pre-form to undergo expansion by a gaseous fluid). This, in turn, insures that the positions of molecules in the major portion of the expanded pre-form 20 shown in FIG. 5 are fixed prior to pneumatic shaping of the bottom portion (closed end) 19 to convert the latter into the bottom 22 of the finished article 12A shown in FIG. 6. Thus, the conversion of bottom portion 19 (which is not in contact with the adjacent intermediate and bottom surfaces 8c, 8a bounding the lower part of the cavity 8) into the bottom 22 of the finished article 12A does not entail any pneumatically induced axial stretching of the major portion 21 of the expanded pre-form 20. The direction or directions in which the bottom portion 19 expands to be converted into the bottom 22 of the finished article 12A depend on the configuration of the corresponding internal surfaces 8a, 8b of the mold 2. Thus, the portion 19 can be subjected to biaxial stretching. Alternatively, the conversion of the portion 19 into the bottom 22 can involve mainly or exclusively radial expansion of the portion 19. In either event, the major portion of the pre-form 20 shown in FIG. 5 is not subjected to simultaneous additional axial stretching. This means that all zones of the finished article 12A, including the bottom 22 and especially the intermediate portion 22A between the bottom 22 and the major portion 21, are subjected to a more uniform stretching action which enhances the physical characteristics of the article.

The steps of a modified multi-stage blow molding method are illustrated in FIGS. 7 through 11. FIG. 7 shows a pre-form 24 which is introduced into a final blow mold 27 and is about to be mechanically stretched by a rod 25 which is reciprocable in a blow tube 25a. Mechanical stretching is accompanied or followed by pneumatic expansion (indicated by phantom lines, as at 26) in response to admission of a gaseous blowing fluid at moderate pressure. The method of FIGS. 7 to 11 differs from the method which is depicted in FIGS. 4-6 in that the mechanical stretching results in elongation of the pre-form beyond the point P (FIG. 11), namely, the pre-form is made longer than the finished article. The point P designates the highest point of the bottom of the finished article 12B. In order to allow for "shortening" of the pre-form subsequent to mechanical stretching by the rod 25, the final blow mold 27 comprises a reciprocable end portion 28 which resembles a plunger and is movable in directions indicated by arrows A and B. In FIGS. 7 and 8, the plunger 28 is held in a lower end position and is movable (through a distance s shown in FIG. 11) to an upper end position which is shown in FIGS. 9 and 10. When the plunger 28 assumes the upper end position of FIGS. 9 and 10, the final blow mold 27 defines a smaller-volume cavity 29' bounded by internal surfaces 29a, 29b, 29c whose configuration corresponds to that of the exterior of the finished article 12B. The enlarged or larger volume cavity which is defined by the mold 27 in the lower end position of the plunger 28 is shown at 29.

Mechanical stretching of the pre-form 24 in the cavity 29 is accompanied or followed by pneumatic expansion so that the major portion of the pre-form contacts the adjacent internal peripheral surface 29b of the mold 27 (in the lower end position of the plunger 28). The region of contact between the pre-form and the peripheral surface 29b of the mold 27 can extend downwardly to or close to the level of the apex 30 of the raised central section or protuberance 31 of the plunger 29. This entails a pronounced stretching of the bottom portion (closed end) 32 of the pre-form.

In the next step, the plunger 28 is moved upwardly (see the arrow A in FIG. 9). This results in the formation of an annular pocket 33 which surrounds the raised central section 31 of the plunger 28. At the same time, the pre-form portion 35 which is adjacent to the lower end of the major portion 34 is caused to move into contact with the adjacent lowermost portion of the internal peripheral surface 29b of the final blow mold. The effect upon the physical characteristics of the finished article 12B is the same as described in connection with FIGS. 4 to 6.

The manner in which the bottom portion and the adjacent intermediate portion of the pre-form are converted into the corresponding portions of the finished article 12B is illustrated in detail in FIG. 11. The extended position of the rod 25, the lower end position of the plunger 28 and the intermediate position of the bottom portion 32 of the pre-form are indicated by phantom lines. The position of the bottom portion 32 is that position which the bottom portion assumes prior to reaching the deformation stage which is shown in FIG. 8. The raised position of the plunger 28 and the configuration of the bottom portion 32 during the next stage of transformation into the finished article 12B are shown by solid lines (such positions and configurations correspond to those shown in FIG. 9). It will be noted that, when the plunger 28 moves from the lower end position to the raised position, the bottom portion of the pre-form is caused to bulge inwardly (i.e. upwardly) whereby the marginal zone of the bottom portion defines the aforementioned annular pocket 33 and the pre-form portion 35 is deformed to assume the shape shown at 35' in which it contacts or nearly contacts the adjacent lower portion of the internal peripheral surface of the final blow mold. The center of the bottom portion of the pre-form overlies the raised portion 31 of the plunger 28 and constitutes a cone without a pronounced tip.

The formation of annular pocket 33 with an inwardly and upwardly sloping wall portion 36 insures that, when the pre-form thereupon receives a gaseous blowing medium at elevated pressure, the pressure has components acting downwardly as well as outwardly (with respect to the apex 30 of the raised portion 31). Consequently, the annular pocket 33 undergoes radial as well as axial (i.e., biaxial) expansion, the same as the major portion 37 of the finished article. The central zone of the bottom portion 37a of the pre-form can participate in such expansion if the pressure upon the rod 25 (i.e., the mechanical stress upon the pre-form) is relaxed.

The finished article 12B is shown in FIG. 10. When the transformation of pre-form 24 into the article 12B is completed, the plunger 28 moves downwardly (arrow B) to reassume the position of FIG. 7 and the finished article 12B is removed in the customary way upon opening of the final blow mold 27. The reference character 38 denotes a cylinder which guides the plunger 28, and the reference character 37 denotes the major portion of the article 12B.

It is already known to provide a blown hollow thermoplastic article with a concavo-convex bottom having a concave outer side. Reference may be had to U.S. Pat. No. 3,949,034 which discloses a final blow mold with a reciprocable portion serving to provide the bottom of the finished article with a concavo-convex outline. However, the shaping of the bottom takes place simultaneously with blowing, i.e., the major portion of the parison is expanded into contact with the peripheral surface of the mold simultaneously with movement of the bottom against the reciprocable portion of the mold. A similar technique is described in U.S. Pat. No. 3,949,033, namely, a parison is converted into a shaped article with a flat bottom and the mold portion (such as a sheet metal plate) against which the flat bottom abuts is thereupon withdrawn laterally of the mold. A vertically reciprocable plunger is then caused to bear against the outer side of the flat bottom in order to provide the outer side of the bottom with a recess. The just discussed prior art is concerned with the making of hollow shaped articles having concavo-convex bottoms. On the other hand, the making of a concavo-convex bottom in accordance with the method of FIGS. 3 to 6 or 7 to 11 is considered a necessary adjunct for the sole purpose (or primarily) to insure that the material of the bottom and of the portion surrounding the bottom and merging into the major portion of the finished article will undergo satisfactory (uniform) biaxial orientation during conversion of the closed end of the pre-form into the corresponding portions of the finished article.

FIGS. 12 to 14 illustrate the stages of a further multi-stage blow molding method. A feature common to the methods which can be practiced with the apparatus of FIGS. 7–11 and 12–14 is that the final blow mold 39 of FIGS. 12–14 also comprises a reciprocable portion or plunger 40 which is mounted on a piston rod 40a and is movable between the upper end position of FIG. 12 and the lower end position of FIGS. 13–14. Thus, the final blow mold 39 also establishes optimum conditions for biaxial stretching of the bottom portion (closed end 41A) of that part of the pre-form which is converted into the bottom 45 of the finished article 12D. The major portion of the pre-form is pneumatically expanded during a first stage of transformation into the finished article 12D, and the second stage involves abrupt conversion of the remaining (bottom) portion of the pre-form into the bottom 45 and the adjacent portion 45A of the finished article. The conversion of the lower portion of the pre-form into the corresponding portion of the finished article is accompanied by a change in the volume of the cavity which is defined by the final blow mold 39, namely, by a change of the volume of that portion of the cavity which is located below the major portion of the pre-form.

The methods of FIGS. 7–11 and 12–14 differ in that, according to the embodiment of FIGS. 12–14, the final stage of conversion of the pre-form into the finished article 12D takes place simultaneously with an increase (rather than a reduction) of the volume of the mold cavity. In other words, the plunger 40 is held in the raised position during the first stage of transformation of the pre-form into the finished article and is caused to move downwardly during the next-following second stage which results in the conversion of lower portion (closed end 41A) of the pre-form into the bottom 45 and the adjoining portion 45A of the finished article 12D.

Referring more specifically to FIG. 12, the plunger 40 is held in the raised position and the pre-form (e.g., a pre-form of the type shown in FIG. 1 or 7) is already converted into a modified preform 41 whose external surface closely follows the outline of the entire surface bounding the relatively small cavity 42 of the final blow mold 39.

The plunger 40 is thereupon moved downwardly through a distance y whereby the volume of the cavity 42 increases so that it matches that volume which is necessary for transformation of the modified pre-form into the finished article 12D. The stretching rod 43 moves downwardly in synchronism with downward movement of the plunger 40; this results in the formation of a hollow conical bottom portion 44 which is subjected to biaxial stretching in response to admission of highly pressurized gaseous blowing fluid via one or more orifices in the blow tube 43a and/or its stretching rod 43. The conical portion 44 is thereby converted into the bottom 45 of the finished hollow article 12A. The orientation of material in the major portion 46 of the article is completed prior to admission of blowing fluid at elevated pressure.

The reference character 40b denotes the horizontal upper side of the plunger 40; this upper side is the internal bottom surface of the mold 39.

When the capacity of the finished article is between 0.2 and 2 liters, the initial pressure of the blowing fluid is preferably between 0.5 and 2.5 bar. For example, and assuming that the finished article 12D of FIG. 14 can store 2 liters of a fluid or a flowable granular or pulverulent material, the pressure which is applied to the internal surface of the pre-form which is converted into the pre-form 41 and thereupon into the pre-form of FIG. 13 will be between 0.5 and 2.5 bar. The higher pressure which results in abrupt transformation of the bottom portion of the pre-form into the bottom 45 and adjoining portion 45A of the finished article 12D is between 12 and 25 bar.

EXAMPLE

The improved method was utilized for the production of a bottle with a volume of 0.5 liter and having a weight of approximately 33 grams. The initial pressure which was applied to the internal surface of the pre-form to convert the major portion of such pre-form into the main portion of the finished bottle was approximately 0.5 bar. The raised pressure which was applied for conversion of the bottom portion of the pre-form into the bottom of the bottle was approximately 16 bar. The range of working pressures is a function of the stretching temperature which, in turn, is a function of the duration of a cycle. The ratio of the volume of the bottom portion to the volume of the main portion of the finished article depends on the length, diameter and shape of the hollow article. As a rule (for example, in the making of bottles having a capacity of between 0.5 and one liter), the aforementioned ratio is between 1:5 and 1:7.

The present invention is based on the recognition that the drawbacks of conventional multi-stage blow molding methods including that which is disclosed in U.S. Pat. No. 3,781,395 can be avoided, either entirely or at least to a substantial degree, by insuring uniform biaxial orientation of all portions of a finished article, i.e., a satisfactory biaxial orientation of the major portion as well as an equally satisfactory (or at least pronounced) biaxial orientation of the remaining portion which, in the case of plastic bottles, includes the bottom and the annular portion between the bottom and the major portion. In other words, the absolute expansion or stretching is not as important as the uniformity of expansion or stretching in all or nearly all portions of the finished article. The uniformity is desirable in all portions of the article and also as concerns the components of biaxial orientation. Otherwise stated, the ratio of radial to axial orientation should be the same or should remain within a rather narrow range in the major portion, in the bottom as well as in the annular portion between the bottom and the major portion of a finished shaped article. As discussed above, the solution resides in that the orientation of molecules in the major portion of the pre-form is completed or practically completed prior to the second fluid admitting step which is carried out in such a way that the orientation of molecules in the remaining portion of the pre-form is identical with or similar to that in the major portion. Thus, the molecules in the major portion of the pre-form do not participate in orientation which takes place during admission of a blowing medium at elevated pressure. The aforedescribed molds which are shown in FIGS. 4 to 14 insure that the admission of a blowing fluid at elevated pressure results in radial as well as axial expansion of the bottom and of the adjacent annular portion of the pre-form. In each of these molds, the bottom undergoes expansion in the radial direction as well as expansion in the axial direction of the cavity. In each instance, the unfilled portion of the cavity at the outside of the closed end of the pre-form is sufficiently large and is configurated in such a way that the pre-form portion which is deformed in the course of the second fluid admitting step undergoes pronounced radial as well as pronounced axial expansion. The making of a bottom which has a concave outer side is a byproduct of the blowing of a hollow shaped article wherein biaxial orientation of the material in the bottom and the annular portion adjacent to the bottom is identical or practically identical with biaxial orientation of the material of the major portion.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above described contribution to the art and, therefore, such adaptations should and are intended to be comprehended within the meaning and range of equivalence of the claims.

What is the claimed is:

1. In a method of transforming a hollow thermoplastic pre-form which is closed at one end and open at the other end into a hollow shaped article, which method comprises the steps of introducing a blow tube into the open end of the pre-form and confining the pre-form in the cavity of a blow mold wherein the cavity is bounded by a bottom surface which is remote from the open end of the pre-form in the mold, a peripheral surface which surrounds the major portion of the pre-form in the mold between the open end of the pre-form and close to the bottom surface and an intermediate surface between the peripheral and bottom surfaces; mechanically stretching the pre-form in the mold; admitting into the pre-form a blowing fluid at a first pressure via the blow tube in the course of said stretching step; and admitting into the pre-form a blowing fluid at a higher second pressure upon at least substantial completion of said stretching step, the improvement which consists in maintaining said first pressure at a level at which said major portion of the pre-form in the mold is expanded into contact with the peripheral surface and in such selection of said second pressure as to effect abrupt biaxial pneumatic expansion of the remaining portion of the pre-form against the intermediate and bottom surfaces of the mold.

2. In a method as defined in claim 1, wherein said first pressure is between 0.5 and 2.5 bar.

3. In a method as defined in claim 1, wherein said second pressure is between 12 and 25 bar.

4. A method of transforming a hollow thermoplastic pre-form which is closed at one end and open at the other end into a hollow shaped article, comprising the steps of introducing a blow tube into the open end of the pre-form and confining the pre-form in the cavity of a blow mold; mechanically stretching the pre-form in the mold, including increasing the distance between the open and closed ends of the pre-form; admitting into the pre-form a blowing fluid at a first pressure via the blow tube to effect pneumatic expansion of the entire pre-form into full contact with the mold; thereupon increasing the volume of the cavity including enlarging the cavity beyond the closed end of the expanded pre-form, said stretching step including converting the closed end of the expanded pre-form into a hollow cone; and admitting into the pre-form a blowing fluid at a higher second pressure via the blow tube to effect abrupt biaxial pneumatic expansion of said hollow cone against the mold.

5. A method as defined in claim 4, wherein the mold has a transverse bottom surface bounding that part of the cavity which is remote from the open end of the pre-form in the mold, said first fluid admitting step including deforming the closed end of the pre-form against the bottom surface and said volume increasing step including shifting the bottom surface in a direction away from the open end of the pre-form in the mold, said stretching step including moving the center of the deformed closed end of the pre-form against the shifted bottom surface of the mold.

6. A method of transforming a hollow thermoplastic pre-form which is closed at one end and open at the other end into a hollow shaped article, comprising the steps of introducing a blow tube into the open end of the pre-form and confining the pre-form in the cavity of a blow mold wherein the cavity is bounded by a bottom surface which is remote from the open end of the pre-form in the mold, a peripheral surface which surrounds the pre-form in the cavity between the open end of the pre-form and close to the bottom surface, and an intermediate surface disposed between the peripheral and bottom surfaces; mechanically stretching the pre-form in the mold, including increasing the distance between the open and closed ends of the pre-form; admitting into the pre-form a blowing fluid at a first pressure via the blow tube to effect penumatic expansion of the pre-form into contact with the peripheral surface except for that portion of the peripheral surface which is immediately adjacent to the intermediate surface; converting the closed end of the pre-form into a hollow cone including changing the volume of the cavity, the hollow cone being spaced apart from the intermediate surface and from a portion at least of the bottom surface of the mold; and thereupon admitting into the pre-form a blowing fluid at a higher second pressure via the blow tube to effect abrupt biaxial pneumatic expansion of the pre-form against said portion of the peripheral surface and against the intermediate and bottom surfaces of the mold.

7. A method as defined in claim 6, wherein the bottom surface is located at a level below the peripheral surface and has an apex, said stretching step including moving the closed end of the pre-form against the apex of the bottom surface and said volume changing step including moving the bottom surface toward the open end of the pre-form to thereby cause the closed end to overlie the apex of the bottom surface and be converted into a hollow cone.

8. A method as defined in claim 7, wherein said second fluid admitting step is carried out with a delay following completion of said first fluid admitting step such as to allow the major portion of the pre-form to set as a result of heat exchange with the peripheral surface and/or with the fluid whereby the major portion is capable of resisting expansion in the course of said second fluid admitting step.

9. A method as defined in claim 7, wherein said volume changing step includes moving the apex of the bottom surface to the general level of the nearest end of the expanded major portion of the pre-form, such level at least approximating the level of the topmost point of the bottom of the shaped article.

10. A method as defined in claim 7, wherein said volume changing step further includes converting that portion of the pre-form which is located between the major portion and the hollow cone into an annular pocket.

11. A method as defined in claim 10, wherein said volume changing step further includes moving the annular pocket at least close to the intermediate surface of the mold.

* * * * *